No. 616,730. Patented Dec. 27, 1898.
J. C. REYNOLDS.
SAFETY GAS REGULATOR.
(Application filed Mar. 30, 1898.)

(No Model.)

WITNESSES

INVENTOR
John C. Reynolds
by Bakewell & Bakewell
his attys.

UNITED STATES PATENT OFFICE.

JOHN C. REYNOLDS, OF VENICE, PENNSYLVANIA.

SAFETY GAS-REGULATOR.

SPECIFICATION forming part of Letters Patent No. 616,730, dated December 27, 1898.

Application filed March 30, 1898. Serial No. 675,676. (No model.)

*To all whom it may concern:*

Be it known that I, JOHN C. REYNOLDS, of Venice, in the county of Washington and State of Pennsylvania, have invented a new and useful Improvement in Safety Gas-Regulators, of which the following is a full, clear, and exact description, reference being had to the accompanying drawings, forming part of this specification, in which—

Figure 1:
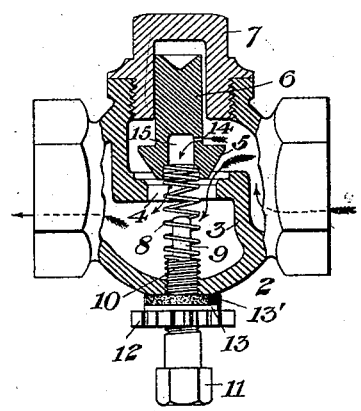
Figure 2:
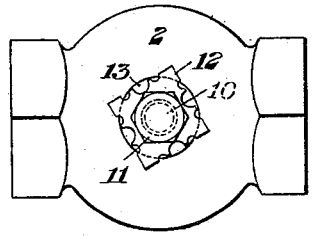

Figure 1 is a sectional side elevation of my improved regulator, and Fig. 2 is a bottom plan view of the same.

My invention relates to the regulators for controlling the flow of gas to a burner, and is designed to provide a simple, cheap, and effective device of this character which will prevent the pressure exceeding a certain predetermined limit without entirely shutting off the flow of gas when the pressure exceeds this limit.

In the drawings, 2 represents a gas-pipe connection containing the separating-bridge 3. This bridge is provided with a hole 4, around which is formed a seat for a downwardly-seating conical valve 5, the upwardly-extending stem 6 of which is guided within a hole or recess of the screw-plug 7, closing the top of the connection. The valve is normally held elevated by a spring 8, which preferably enters a central socket in the valve and the lower end portion of which surrounds the reduced stem 9 of a screw or bolt 10, which extends through a hole in the bottom of the connection and engages suitable screw-threads therein. The head 11 of the bolt is preferably squared for the application of a wrench, though it may be slotted for receiving a screw-driver, if desired, and this bolt is locked in adjusted position by a nut 12, bearing upon a washer 13, between which and the bottom of the connection or casing I preferably place a packing 13', of leather or other suitable material. A small hole 14 extends through the valve or into an inner cavity 15 therein, so that even when the valve is closed a small amount of gas may pass therethrough.

The operation of the device is as follows: The regulator being placed in the pipe leading to the burner so that the gas will pass through it in the direction indicated by the arrows of Fig. 1, the pressure of the spring upon the valve is regulated by turning the bolt, which is then locked in adjusted position by the nut. As the gas flows through this regulator it presses upon the top of the valve and tends to close it, this pressure being opposed by the spring, which is set so as to allow the desired amount of gas to pass. Whenever the pressure exceeds this desired amount, it will force the valve to its seat and the supply will be cut off, except for the small amount passing through the hole in the valve. As soon as the pressure is lowered it will equalize upon both sides of the valve by reason of the gas passing through the small hole, and the spring will then lift the valve, allowing the gas to flow to the burner, as before.

The advantages of my invention will be apparent to those skilled in the art, since the danger arising from excessive pressure at the burner is done away with, the supply being automatically regulated, while enough gas will always pass to keep the burner lighted. The construction is simple and can be made at a low cost and in practice is found to be extremely effective.

I claim—

1. In a gas-regulator, a valve located in a suitable casing and arranged to seat in the direction of the line of flow, said valve having a small passage through it to allow a small amount of fluid to pass when closed, a spring in line with the valve, and normally pressing it from its seat, and means for regulating the tension of the spring; substantially as described.

2. In a regulator, a casing containing a valve arranged to seat in the direction of the line of flow, said valve having a small passage extending through it, a spring bearing upon the valve and normally pressing it from its seat, a screw-plug arranged to regulate the pressure of the spring, and suitable guides for the valve.

3. In a regulator, a casing containing a vertically-movable valve which seats in the direction of the line of flow, said valve having a small hole therethrough, a spring in line with the valve and pressing upon its lower portion to normally force it from its seat, and an adjustable screw-plug bearing upon the other end of the spring.

4. In a regulator, a casing containing a vertically-movable downwardly-seating valve having an upwardly-extending stem, a hollow screw-plug surrounding and guiding the stem, said valve having a small hole therethrough, a spring bearing centrally upon the bottom of the valve to force it upwardly from its seat, a screw or bolt extending through the casing and bearing upon the base of the spring, and a nut arranged to lock the screw or bolt in adjusted position.

In testimony whereof I have hereunto set my hand.

JOHN C. REYNOLDS.

Witnesses:
   H. L. BRADMON,
   J. B. DETRY.